(12) United States Patent
Engelkemier et al.

(10) Patent No.: US 11,803,180 B2
(45) Date of Patent: Oct. 31, 2023

(54) DETERMINING DIAGNOSTIC COVERAGE FOR ACHIEVING FUNCTIONAL SAFETY

(71) Applicant: Ethernovia Inc., San Jose, CA (US)

(72) Inventors: Darren S. Engelkemier, Menlo Park, CA (US); Roy T. Myers, Jr., Morgan City, CA (US); Hossein Sedarat, San Jose, CA (US); Ramin Shirani, Morgan Hill, CA (US)

(73) Assignee: Ethernovia Inc., San Jose, CA (US)

( * ) Notice: Subject to any disclaimer, the term of this patent is extended or adjusted under 35 U.S.C. 154(b) by 88 days.

(21) Appl. No.: 17/451,048

(22) Filed: Oct. 15, 2021

(65) Prior Publication Data

US 2022/0035363 A1 Feb. 3, 2022

Related U.S. Application Data

(60) Provisional application No. 63/092,246, filed on Oct. 15, 2020.

(51) Int. Cl.
G05B 23/02 (2006.01)

(52) U.S. Cl.
CPC ....... G05B 23/0294 (2013.01); G05B 23/021 (2013.01); G05B 23/0237 (2013.01); G05B 23/0297 (2013.01)

(58) Field of Classification Search
CPC .............. G05B 23/0294; G05B 23/021; G05B 23/0237; G05B 23/0297
See application file for complete search history.

(56) References Cited

U.S. PATENT DOCUMENTS

| | | | |
|---|---|---|---|
| 4,967,347 A | 10/1990 | Smith et al. | |
| 10,810,079 B2 | 10/2020 | Halbert et al. | |
| 11,416,662 B1* | 8/2022 | Armato | G06F 30/3308 |
| 11,520,963 B2* | 12/2022 | Strasser | G01R 31/2844 |
| 2005/0106713 A1 | 5/2005 | Phan et al. | |
| 2014/0013182 A1 | 1/2014 | Cheng et al. | |
| 2015/0332463 A1 | 11/2015 | Galera et al. | |
| 2017/0139761 A1 | 5/2017 | Song et al. | |

(Continued)

FOREIGN PATENT DOCUMENTS

| | | |
|---|---|---|
| CN | 107085648 | 8/2017 |
| WO | 2019142484 | 7/2019 |

OTHER PUBLICATIONS

"U.S. Appl. No. 17/132,556, Non Final Office Action dated Jun. 16, 2022", 10 pgs.

(Continued)

*Primary Examiner* — Mischita L Henson
(74) *Attorney, Agent, or Firm* — Schwegman Lundberg & Woessner, P.A.

(57) ABSTRACT

Disclosed are systems, methods, and non-transitory computer-readable media for determining diagnostic coverage for achieving functional safety. A diagnostic coverage determination system employs an optimized process for efficiently determining a diagnostic coverage level of an electronic circuit. The diagnostic coverage determination system generates an optimized netlist that includes a reduced number of nodes by applying one or more node reduction techniques. The diagnostic coverage is determined based on the optimized netlist, thereby reducing the number of nodes that are injected with faults.

18 Claims, 8 Drawing Sheets

(56) References Cited

U.S. PATENT DOCUMENTS

| | | | |
|---|---|---|---|
| 2017/0272102 A1 | 9/2017 | Goldenberg et al. | |
| 2018/0322008 A1 | 11/2018 | Chung et al. | |
| 2019/0050307 A1* | 2/2019 | Locker | G06F 30/327 |
| 2020/0004627 A1 | 1/2020 | Sharon et al. | |
| 2020/0043256 A1 | 2/2020 | Rocci et al. | |
| 2020/0364958 A1 | 11/2020 | Lewis et al. | |
| 2021/0049068 A1 | 2/2021 | Schaefer et al. | |

OTHER PUBLICATIONS

"U.S. Appl. No. 17/451,051, Non Final Office Action dated Sep. 1, 2022", 10 pgs.

"U.S. Appl. No. 17/451,049, Non Final Office Action dated Sep. 2, 2022", 13 pgs.

"U.S. Appl. No. 17/132,556, Response filed Sep. 16, 2022 to Non Final Office Action dated Jun. 16, 2022", 11 pgs.

"U.S. Appl. No. 17/451,051, Response filed Nov. 29, 2022 to Non Final Office Action dated Sep. 1, 2022", 11 pgs.

"U.S. Appl. No. 17/451,049, Response filed Dec. 1, 2022 to Non Final Office Action dated Sep. 2, 2022", 12 pgs.

Lim, Seung-Ho, "A Stepwise Rate-Compatible LDPC and Parity Management in NAND Flash U Memory-Based Storage Devices", IEEE Access, vol. 8, pp. 162491-162506, (2020), 16 pgs.

"U.S. Appl. No. 17/132,556, Notice of Allowance dated Dec. 21, 2022", 8 pgs.

"U.S. Appl. No. 17/132,556, Corrected Notice of Allowability dated Jan. 5, 2023", 2 pgs.

"U.S. Appl. No. 17/451,049, Notice of Allowance dated Jan. 17, 2023", 11 pgs.

"U.S. Appl. No. 17/451,051, Notice of Allowance dated Jan. 26, 2023", 8 pgs.

Cai, Y., "Error Characterization, Mitigation, and Recovery in Flash-Memory-Based U Solid-State Drives", vol. 105, No. 9, pp. 1666-1704, Sep. 2017, doi:10.1109 JPROC.2017.2713127. (Year: 2017), 39 pgs.

"U.S. Appl. No. 17/451,049, Corrected Notice of Allowability dated Apr. 27, 2023", 2 pgs.

"U.S. Appl. No. 17/451,051, Corrected Notice of Allowability dated Apr. 27, 2023", 2 pgs.

U.S. Appl. No. 17/132,556, filed Dec. 23, 2020, Recursive System Layer Analysis for Achieving Functional Safety.

U.S. Appl. No. 17/451,046, filed Oct. 15, 2021, Efficient Safety Mechanism Selection for Achieving Functional Safety.

U.S. Appl. No. 17/451,051, filed Oct. 15, 2021, Redundant Segment for Efficient In-Service Testing.

U.S. Appl. No. 17/451,049, filed Oct. 15, 2021, In-Service Scanning and Correction of Stored Data for Achieving Functional Safety.

* cited by examiner

DETERMINING DIAGNOSTIC COVERAGE FOR ACHIEVING FUNCTIONAL SAFETY

CROSS-REFERENCE TO RELATED APPLICATIONS

The present application claims the benefit of priority of U.S. Provisional Application No. 63/092,246, filed on Oct. 15, 2020, which is incorporated herein by reference in its entirety.

TECHNICAL FIELD

An embodiment of the present subject matter relates generally to functional safety, and more specifically, to determining diagnostic coverage for achieving functional safety.

BACKGROUND

Certain electronic applications, such as Safety-critical automotive applications, have stringent demands for functional safety and reliability. The International Organization for Standardization (ISO) has established an international standard known as ISO 26262 "Road vehicles—Functional safety." Although ISO 26262 is titled "Road vehicles—Functional safety," it relates to the functional safety of the electrical and electronic systems within vehicles, including the systems as a whole.

ISO 26262 defines four Automotive Safety Integrity Levels (ASILs), spanning from a least stringent safety level defined as ASIL-A to a most stringent safety level defined as ASIL-D. Each ASIL defines a level of safety measures that are required for avoiding an unreasonable residual risk. For example, ASIL-B requires that 90% of faults that can propagate and cause a system failure be detected, whereas the more stringent safety level of ASIL-D requires that 99% of these faults be detected. ASIL-D is targeted for mission critical applications, such as Integrated Circuits (ICs) used for braking, steering, or autonomous driving, that could cause life-threatening to fatal injuries if a failure occurred.

Current Electronic Design Automation (EDA) tools measure diagnostic coverage through a fault campaign simulation in which faults are injected to determine whether they are detected by the implemented safety mechanisms. This approach is time prohibited as current ICs are often comprised of millions of transistors. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
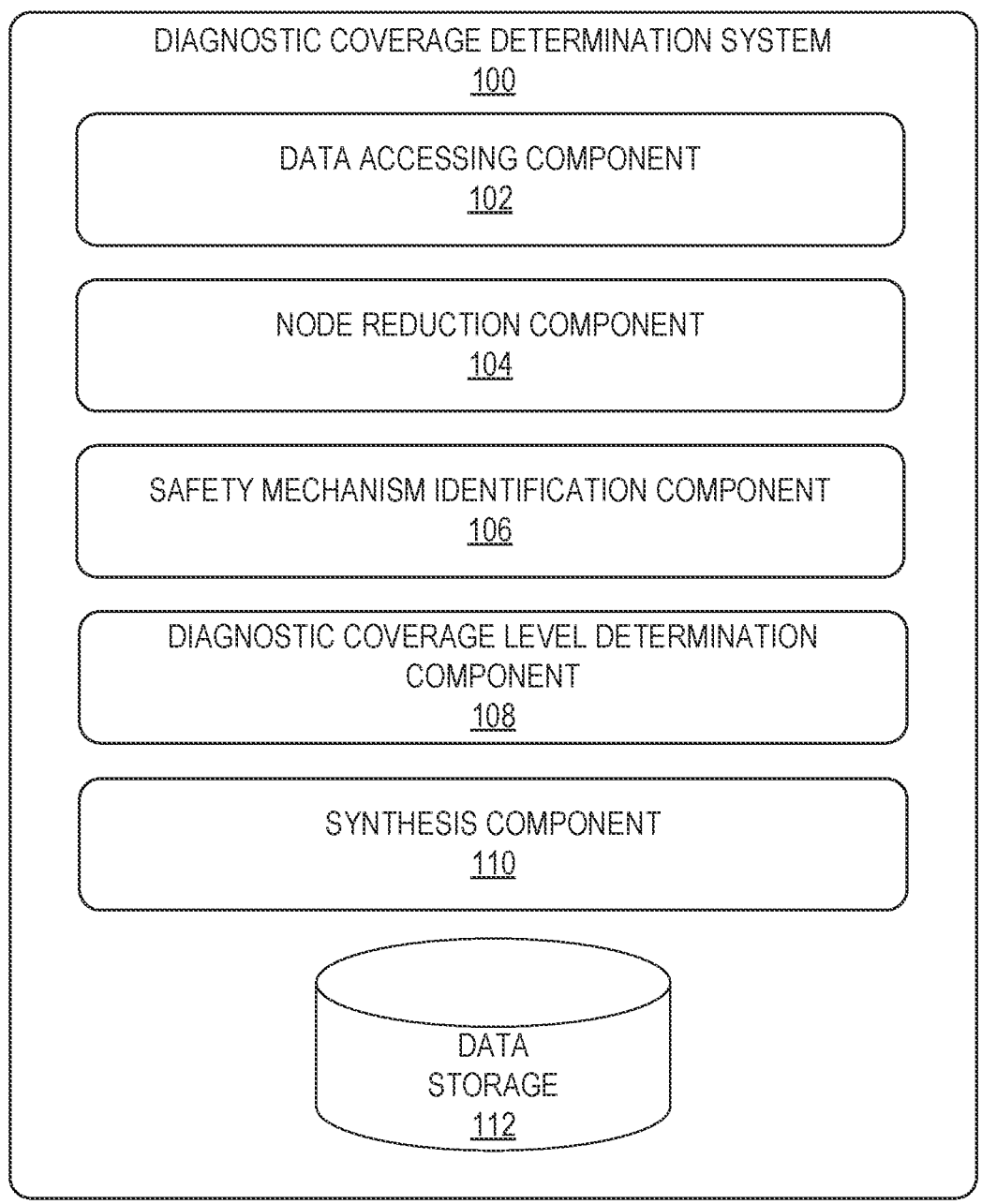
FIG. 1 is a block diagram of a diagnostic coverage determination system, according to certain example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for determining diagnostic coverage for achieving functional safety. A diagnostic coverage determination system employs an optimized process for efficiently determining a diagnostic coverage level of an electronic circuit. A diagnostic coverage level describes the effectiveness of included safety mechanisms at detecting faults in the electronic circuit. A safety mechanism as a technical solution implemented by electronic functions or elements, or by other technologies, to detect faults or control failures to achieve or maintain a safe state. The effectiveness of a safety mechanism can be measured using various metrics, such as a single-point fault metric (SPFM), latent (e.g., multi-point) fault metric (LFM), Failure in Time (FIT), as well as a probability of the risk (e.g., probabilistic metrics for hardware failures (PMHF)).

The diagnostic coverage level of an electronic circuit is determined based on a netlist describing the connectivity of the various nodes included in the electronic circuit, Current EDA tools determine the diagnostic coverage level of an electronic circuit by injecting faults at every node included in the netlist. This process is extremely complex and requires significant computing resources and time. The time needed to determine the diagnostic coverage level of larger electronic circuits may be prohibitive to completing a circuit design in a reasonable design time.

To alleviate these issues, the diagnostic coverage determination system generates an optimized netlist that includes a reduced number of nodes. For example, the diagnostic coverage determination system applies one or more node reduction techniques to identify nodes that can be removed from an input netlist for purposes of accurately determining the diagnostic coverage level of the electronic circuit. The diagnostic coverage determination system determines the diagnostic coverage level of the electronic circuit based on the optimized netlist. As a result, the number of nodes that are injected with faults is greatly reduced, thereby reducing the computing resources and time needed to determine the diagnostic coverage level of the electronic circuit.

The diagnostic coverage determination system can perform the optimization process at any point or points during the Application Specific Integration Circuit (ASIC) design process. For example, the diagnostic coverage determination system may optimize the Register Transfer Language (RTL)

netlist, gate level netlist, and/or Design for Test (DFT) netlist. Applying the optimization process earlier in the ASIC design process and/or at multiple points during the ASIC design process greatly reduces the number of nodes in each optimized netlist as well as the final manufacturing netlist.

FIG. 1 is a block diagram of a diagnostic coverage determination system 100, according to certain example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the diagnostic coverage determination system 100 to facilitate additional functionality that is not specifically described herein.

The diagnostic coverage determination system 100 is one or more computing devices configured to determine the diagnostic coverage level of an electronic circuit. The functionality of the diagnostic coverage determination system 100 may be used to satisfy functional safety requirements. The diagnostic coverage determination system 100 may be implemented using any of a variety of types of computing devices, such as computing devices including some or all of the features, components, and peripherals of the machine 800 shown in FIG. 8.

As shown, the diagnostic coverage determination system 100 includes a data accessing component 102, a node reduction component 104, a safety mechanism identification component 106, a diagnostic coverage level determination component 108, a synthesis component 110, and a data storage 112.

The data accessing component 102 accesses data used by the diagnostic coverage determination system 100 to determine a diagnostic coverage level. For example, the data accessing component 102 may access a netlist describing the connectivity of the various nodes in an electronic circuit. The netlist may be a Register Transfer Language (RTL) netlist, a gate level netlist, or a Design for Test (DFT) netlist. The data accessing component 102 may access the netlist from the data storage 112 and/or an external device (not shown) that is in network communication with the data accessing component 102.

The data accessing component 102 also accesses optimization parameters for optimizing the netlist. The optimization parameters include data and/or parameters used to reduce the number of nodes included in the netlist. For example, the optimization parameters may include data identifying node reduction techniques to be applied to the netlist and/or any constraints, such as test settings.

The optimization parameters may also include data describing the context and/or application in which the electronic circuit will be used. The context may include data describing the design and application of the target environment in which the electronic circuit will be used, such as a specified automotive application.

The optimization parameters may also include a statistically meaningful target value. The statistically meaningful target value defines a percentage of the nodes included in the netlist that can be used to properly determine the diagnostic coverage level. That is, the statistically meaningful target value defines a percentage of nodes that should be injected with faults to provide statistically meaningful data for determining the diagnostic coverage level.

The optimization parameters may also include a safety mechanisms file. The safety mechanisms file defines a set of safety mechanisms to be added and/or a set of safety mechanisms to be preserved.

The optimization parameters may also include a coverage objective for the electronic circuit. The coverage objective may be a targeted diagnostic coverage level, such as an ASIL level.

The data accessing component 102 may access the optimization parameters from the data storage 112 and/or an external device (not shown) that is in network communication with the data accessing component 102. The data accessing component 102 may provide the accessed data to the other components of the diagnostic coverage determination system 100 and/or store the accessed data in the data storage 112 where it may be accessed by the other components of the diagnostic coverage determination system 100.

The node reduction component 104 uses one or more node reduction techniques to reduce the number of nodes in the netlist. The node reduction component 104 applies the node reduction techniques based on the netlist and the optimization parameters accessed by the data accessing component 102. The node reduction component 104 may apply varying types of node reduction techniques that reduce the number of nodes based on different inputs and/or factors. For example, the node reduction component 104 may use node reduction techniques based on the context of the electronic circuit, safety mechanisms file, statistically meaningful target value, coverage objective, and the like. The various node reduction techniques are described in greater detail in relation to FIG. 3.

The node reduction component 104 may apply the node reduction techniques in series and/or in parallel. Further, the order in which the node reduction component 104 applies the node reduction techniques may be optimized to provide maximized performance. For example, the machine learning may be used to determine an optimal order in which to apply the node reduction techniques.

The node reduction component 104 may apply all of the node reduction techniques to a netlist or a subset of the node reduction techniques. For example, the node reduction component 104 may apply a subset of the node reduction techniques based on the node reduction techniques to be applied to the netlist as defined in the optimization parameters.

The node reduction component 104 may also determine a subset of the node reduction techniques based on the type of netlist and/or whether the netlist has previously been optimized by the diagnostic coverage determination system 100. For example, in some embodiments, the node reduction component 104 may apply all of the node reduction techniques if the netlist has not yet been optimized (i.e., the first time the netlist is being optimized) and apply a subset of the node reduction techniques if the netlist has previously been optimized. In this type of embodiment, the node reduction component 104 may select the select the node reduction technique to apply to a previously optimized netlist based on the type of netlist. For example, the node reduction component 104 may apply a formal node reduction technique to an optimized RTL netlist, a test node reduction technique to an gate level netlist, a formal node reduction technique to a DFT netlist.

Figure 2:
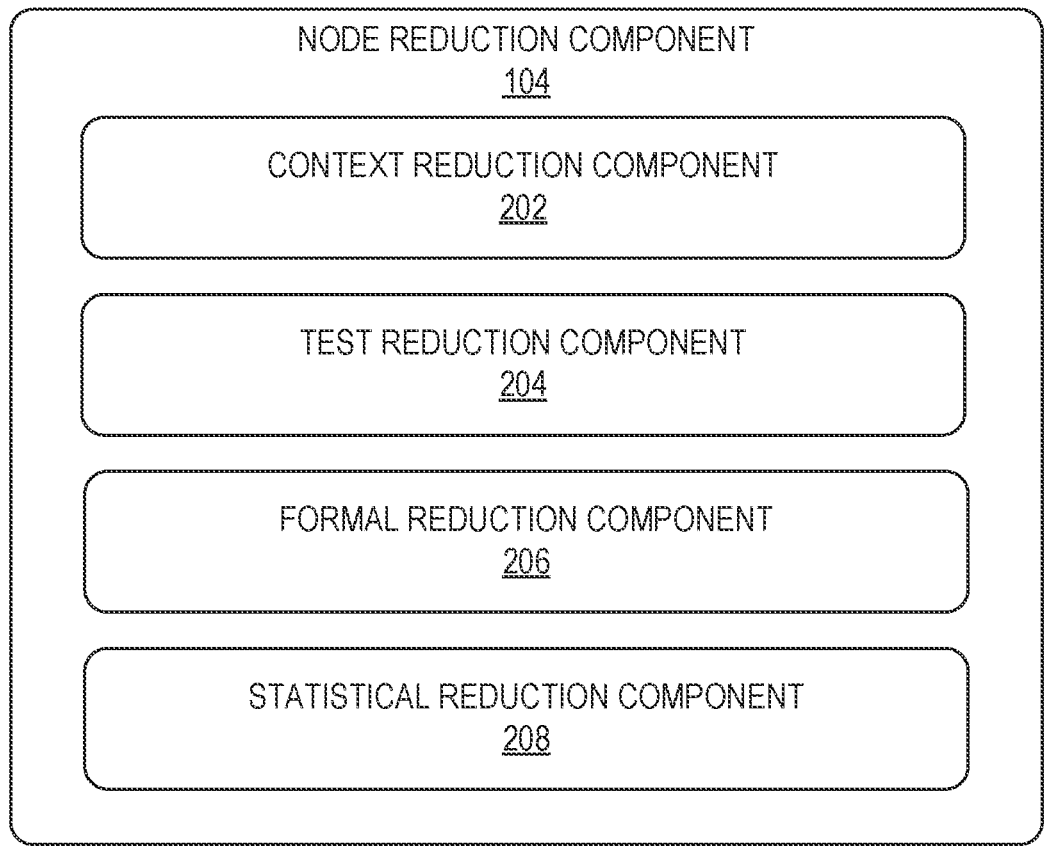
FIG. 2 is a block diagram of a node reduction component, according to some example embodiments.

FIG. 2 is a block diagram of a node reduction component 104, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1, However, a skilled artisan will readily recognize that various additional functional components may be supported by the diagnostic coverage determination system 100 to facilitate additional functionality that is not specifically described herein.

As shown the node reduction component 104 includes a context reduction component 202, a test reduction component 204, a formal reduction component 206, and a statistical reduction component 208.

The context reduction component 202 performs a context node reduction technique to reduce a number of nodes in a netlist. The context reduction component 202 uses the netlist and the context of the electronic circuit as input. The context may include data describing the design and application of the target environment in which the electronic circuit will be used, such as a specified automotive application. The context reduction component 202 uses the context to identify nodes that are unused for the intended application. Many Integrated Circuits (ICs) are designed to target multiple markets and/or fields and thus not all of the features and/or capabilities provided by an IC are needed for each application. Accordingly, the context reduction component 202 identifies the nodes that provide the features and/or capabilities that will be unused for the given application of the electronic circuit. Identification techniques include but are not limited to user input, block/feature/IO name mapping, and machine learning. As these nodes are not used for the given application, they can be excluded from a diagnostic coverage calculation. The context reduction component 202 therefore eliminates these nodes from the netlist, such as by removing them from the fault calculation area and/or accounting the nodes as a safe fault.

The test reduction component 204 performs a test node reduction technique to reduce a number of nodes in a netlist. The test reduction component 204 uses the netlist and provided test settings as input. Test structures can be excluded from functional safety diagnostic coverage calculations as a fault on a test structure does not imply a functional safety violation. The test reduction component 204 identifies the nodes associated with test structures using test pin and logic pattern recognition, including but not limited to scan chain connections, JTAG controllers and connections, memory and logic Built In Self Test (BIST). The test reduction component 204 eliminates the identified nodes from the netlist, such as by removing them from the fault calculation area and/or accounting the nodes as a safe fault.

The formal reduction component 206 performs a formal node reduction technique to reduce a number of nodes in a netlist. The formal reduction component 206 uses the netlist as input. The formal reduction component 206 technique identifies and eliminates unreachable logic or nodes. The formal node reduction technique may further verify logical equivalence of nodes. For example, the formal reduction component 206 may verify that the changes to the netlist have not changed its functionality.

The statistical reduction component 208 performs a statistical node reduction technique to reduce a number of nodes in a netlist. The statistical reduction component 208 uses the netlist and the statistically meaningful target value as input. The statistically meaningful target value defines a percentage of the nodes included in the netlist that can be used to properly determine the diagnostic coverage level. The number of nodes that are injected with faults to accurately determine the diagnostic coverage level can be limited to a statistically meaningful number/percentage of nodes.

The statistically meaningful target value may be a programmable value that can be selected and/or modified by a user of the diagnostic coverage determination system 100. The statistical reduction component 208 uses the statistically meaningful target value to identify a subset of the nodes that can be removed to reduce the number to the statistically meaningful number/percentage of nodes. The statistical reduction component 208 eliminates nodes to provide a uniform sampling of the nodes for determining the diagnostic coverage level.

While the node reduction component 104 is described as providing four node reduction techniques, this is only one example and is not meant to be limiting. The node reduction component 104 may employ any number of node reduction techniques. Applying one or more of node reduction techniques to a netlist results in an optimized netlist with a reduced number of nodes. The reduced number of nodes simplifies additional processing of netlist, including determining the diagnostic coverage level.

Returning to the discussion of FIG. 1, the safety mechanism identification component 106 uses an optimized netlist to identify safety mechanisms. This includes identifying existing safety mechanisms and, optionally, identifying and implementing additional safety mechanisms.

The safety mechanism identification component 106 can identify existing safety measures based on a provided input file that lists the existing safety measure or through use of machine learning/artificial intelligence techniques based on known standard functional safety coverage mechanisms, patterns, and key words. The safety mechanism identification component 106 can identify additional safety measures based on machine learning/artificial intelligence techniques such as pattern matching of safety mechanism libraries to known patterns or by being supplied a list of additional functional safety mechanisms and locations such as from a Functional Safety Mechanism Input File.

Highly efficient functional safety mechanisms tend to fall into patterns or categories. These include but aren't limited to Error Correction Code (ECC), Cyclic Redundancy Check (CRC), and replication (i.e. redundancy), A machine learning model, such as a classification model, can be applied to identify safety mechanisms, thereby eliminating the tedious process of manually identifying the detection points. The machine learning model can be trained using training data based on functional safety mechanisms that have been manually identified, such as by use of key words such as ECC. Generating the training data can be expedited through use of wild card support on signals with similar names, all signals within a module, or a group of signals would ease their identification, as well as through destination source, ports or pins.

In addition to identifying the safety mechanisms, the safety mechanism identification component 106 may also identify the injection nodes for determining the diagnostic coverage level. Rather than the currently process of manually identifying nodes to be injected on, the safety mechanism identification component 106 determines the injection nodes by applying a cone of logic extraction. This identifies the source nodes that feed into each functional safety mechanism. Complete cone of logic extraction can be challenged to see through sequential elements like registers, clock domain crossing, FIFOS, deep cones of logic, or across hierarchical or physical partitions on the semiconductor database The safety mechanism identification component 106 also determines an estimated diagnostic coverage level provided by the identified safety mechanisms, including existing safety mechanisms and, optionally, additional safety mechanisms. The safety mechanism identification component 106 can determine the estimated diagnostic coverage level using a variety of techniques, such by using machine cone of logic extraction, input file, hierarchical name matching, and the like.

The safety mechanism identification component 106 may use the estimated diagnostic coverage level to achieve a target diagnostic coverage level. For example, the safety mechanism identification component 106 may determine whether the estimated diagnostic coverage level meets the target threshold diagnostic coverage level and, if not, identify and implement additional safety mechanisms in an attempt to increase the estimated diagnostic coverage to the target diagnostic coverage level. The functionality of the safety mechanism identification component 106 is described in greater detail in relation to FIGS. 4 and 5.

The diagnostic coverage level determination component 108 verifies the estimated diagnostic coverage level of the electronic circuit based on the existing and/or additional safety mechanisms that were identified or added by the safety mechanism identification component 106. For example, the diagnostic coverage level determination component 108 may perform a fault campaign in which faults are injected into the nodes of the electronic circuit to determine the coverage provided by the safety mechanisms. The diagnostic coverage level determination component 108 performs this process based on the reduced number of nodes in the optimized netlist, thereby reducing the computing resources and time associated with determining the diagnostic coverage level. The diagnostic coverage level determination component 108 may also determine whether the diagnostic coverage level meets the target diagnostic coverage level. Additional safety mechanism may be identified and implement in the event that the diagnostic coverage level does not meets the target diagnostic coverage level.

The synthesis component 110 synthesizes performs a synthesis process that translates the design described in a netlist (e.g., RTL netlist) to actual logic gates (e.g., gate level netlist). The synthesis component 110 may perform the synthesis process based on a safety mechanisms preservation file that defines a set of safety mechanisms to be preserved. For example, the safety mechanisms preservation file identifies safety mechanisms like, redundant critical flops, that should be preserved, thereby preventing the safety mechanisms from being optimized away during the synthesis process. The synthesis process generally attempts to minimize the area and gates within an electronic circuit, hence, any redundant or replicated logic could be eliminated without use of a safety mechanisms preservation file.

Figure 3:
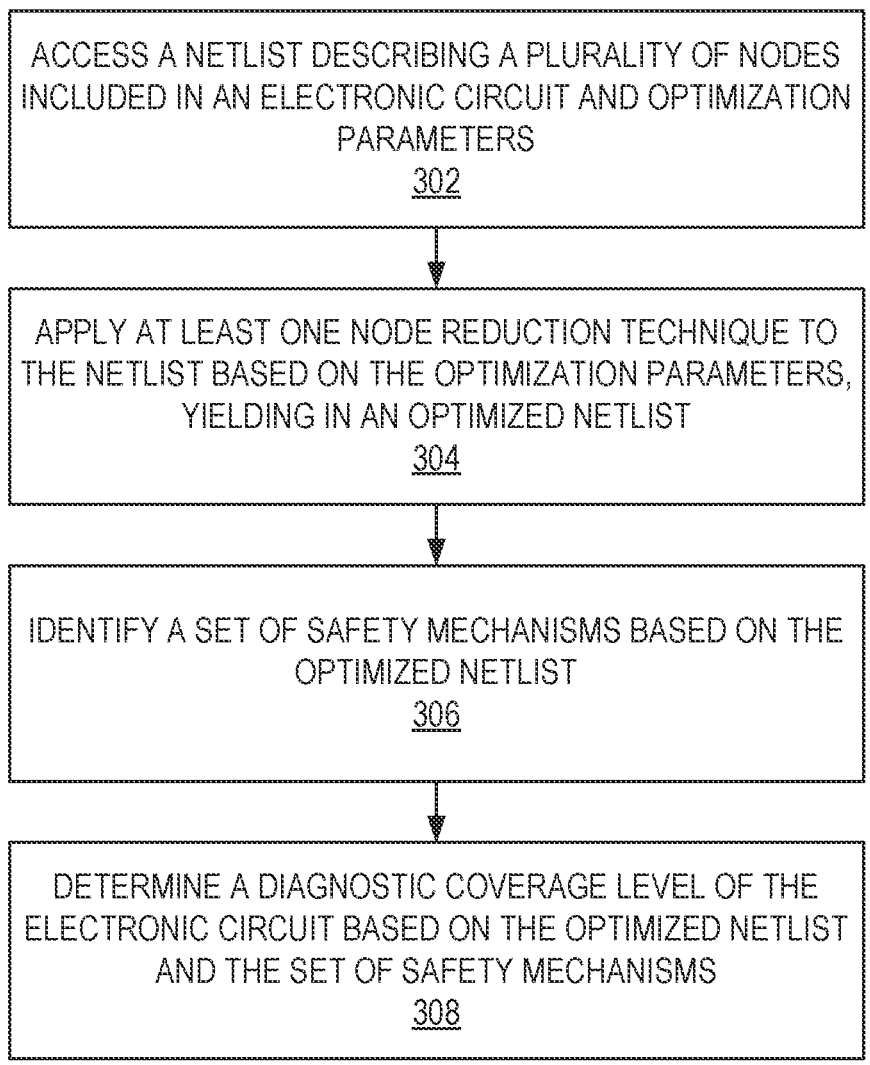
FIG. 3 is a flowchart showing a method for determining diagnostic coverage for achieving functional safety, according to some example embodiments.

FIG. 3 is a flowchart showing a method 300 for determining diagnostic coverage for achieving functional safety, according to some example embodiments. The method 300 may be embodied in computer readable instructions for execution by one or more processors such that the operations of the method 300 may be performed in part or in whole by the diagnostic coverage determination system 100; accordingly, the method 300 is described below by way of example with reference to the diagnostic coverage determination system 100. However, it shall be appreciated that at least some of the operations of the method 300 may be deployed on various other hardware and/or software configurations and the method 300 is not intended to be limited to the diagnostic coverage determination system 100.

At operation 302, the data accessing component 102 accesses a netlist describing a plurality of nodes included in an electronic circuit and optimization parameters. The data accessing component 102 accesses data used by the diagnostic coverage determination system 100 to determine a diagnostic coverage level. For example, the data accessing component 102 may access a netlist describing the connectivity of the various nodes in an electronic circuit. The netlist may be a Register Transfer Language (RTL) netlist, a gate level netlist, or a Design for Test (DFT) netlist. The data accessing component 102 may access the netlist from the data storage 112 and/or an external device (not shown) that is in network communication with the data accessing component 102.

The data accessing component 102 also accesses optimization parameters for optimizing the netlist. The optimization parameters include data and/or parameters used to reduce the number of nodes included in the netlist. For example, the optimization parameters may include data identifying node reduction techniques to be applied to the netlist and/or any constraints, such as test settings.

The optimization parameters may also include data describing the context and/or application in which the electronic circuit will be used. The context may include data describing the design and application of the target environment in which the electronic circuit will be used, such as a specified automotive application.

The optimization parameters may also include a statistically meaningful target value. The statistically meaningful target value defines a percentage of the nodes included in the netlist that can be used to properly determine the diagnostic coverage level. That is, the statistically meaningful target value defines a percentage of nodes that should be injected with faults to provide statistically meaningful data for determining the diagnostic coverage level.

The optimization parameters may also include a safety mechanisms file. The safety mechanisms file defines a set of safety mechanisms to be added and/or a set of safety mechanisms to be preserved.

The optimization parameters may also include a coverage objective for the electronic circuit. The coverage objective may be a targeted diagnostic coverage level, such as an ASIL level.

The data accessing component 102 may access the optimization parameters from the data storage 112 and/or an external device (not shown) that is in network communication with the data accessing component 102. The data accessing component 102 may provide the accessed data to the other components of the diagnostic coverage determination system 100 and/or store the accessed data in the data storage 112 where it may be accessed by the other components of the diagnostic coverage determination system 100.

At operation 304, the node reduction component 104 applies at least one node reduction technique to the netlist based on the optimization parameters, yielding an optimized netlist. The node reduction component 104 uses one or more node reduction techniques to reduce the number of nodes in the netlist. The node reduction component 104 applies the node reduction techniques based on the netlist and the optimization parameters accessed by the data accessing component 102. The node reduction component 104 may apply varying types of node reduction techniques that reduce the number of nodes based on different inputs and/or factors. For example, the node reduction component 104 may use node reduction techniques based on the context of the electronic circuit, safety mechanisms file, statistically meaningful target value, coverage objective, and the like.

The node reduction component 104 may apply the node reduction techniques in series and/or in parallel. Further, the order in which the node reduction component 104 applies the node reduction techniques may be optimized to provide maximized performance. For example, the machine learning may be used to determine an optimal order in which to apply the node reduction techniques.

The node reduction component 104 may apply all of the node reduction techniques to a netlist or a subset of the node reduction techniques. For example, the node reduction component 104 may apply a subset of the node reduction techniques based on the node reduction techniques to be applied to the netlist as defined in the optimization parameters.

The node reduction component 104 may also determine a subset of the node reduction techniques based on the type of netlist and/or whether the netlist has previously been optimized by the diagnostic coverage determination system 100. For example, in some embodiments, the node reduction component 104 may apply all of the node reduction techniques if the netlist has not yet been optimized (i.e., the first time the netlist is being optimized) and apply a subset of the node reduction techniques if the netlist has previously been optimized. In this type of embodiment, the node reduction component 104 may select the select the node reduction technique to apply to a previously optimized netlist based on the type of netlist. For example, the node reduction component 104 may apply a formal node reduction technique to an optimized RTL netlist, a test node reduction technique to an gate level netlist, a formal node reduction technique to a DFT netlist.

At operation 306, the safety mechanism identification component 106 identifies a set of safety mechanism based on the optimized netlist. This includes identifying existing safety mechanisms and, optionally, identifying and implementing additional safety mechanisms.

The safety mechanism identification component 106 can identify existing safety measures based on a provided input file that lists the existing safety measure or through use of machine learning/artificial intelligence techniques based on known standard functional safety coverage mechanisms, patterns, and key words.

The safety mechanism identification component 106 can identify additional safety measures based on machine learning/artificial intelligence techniques such as pattern matching of safety mechanism libraries to known patterns or by being supplied a list of additional functional safety mechanisms and locations such as from a Functional Safety Mechanism Input File.

The safety mechanism identification component 106 also determines an estimated diagnostic coverage level provided by the identified safety mechanisms, including existing safety mechanisms and, optionally, additional safety mechanisms. The safety mechanism identification component 106 can determine the estimated diagnostic coverage level using a variety of techniques, such by using machine cone of logic extraction, input file, hierarchical name matching, and the like.

The safety mechanism identification component 106 may use the estimated diagnostic coverage level to achieve a target diagnostic coverage level. For example, the safety mechanism identification component 106 may determine whether the estimated diagnostic coverage level meets the target threshold diagnostic coverage level and, if not, identify and implement additional safety mechanisms in an attempt to increase the estimated diagnostic coverage to the target diagnostic coverage level.

At operation 308, the diagnostic coverage level determination component 108 determines a diagnostic coverage level of the electronic circuit based on the optimized netlist and the set of safety mechanisms. The diagnostic coverage level determination component 108 verifies the estimated diagnostic coverage level of the electronic circuit based on the existing and/or additional safety mechanisms that were identified or added by the safety mechanism identification component 106. For example, the diagnostic coverage level determination component 108 may perform a fault campaign in which faults are injected into the nodes of the electronic circuit to determine the coverage provided by the safety mechanisms. The diagnostic coverage level determination component 108 performs this process based on the reduced number of nodes in the optimized netlist, thereby reducing the computing resources and time associated with determining the diagnostic coverage level. The diagnostic coverage level determination component 108 may also determine whether the diagnostic coverage level meets the target diagnostic coverage level. Additional safety mechanism may be identified and implement in the event that the diagnostic coverage level does not meets the target diagnostic coverage level.

Figure 4:
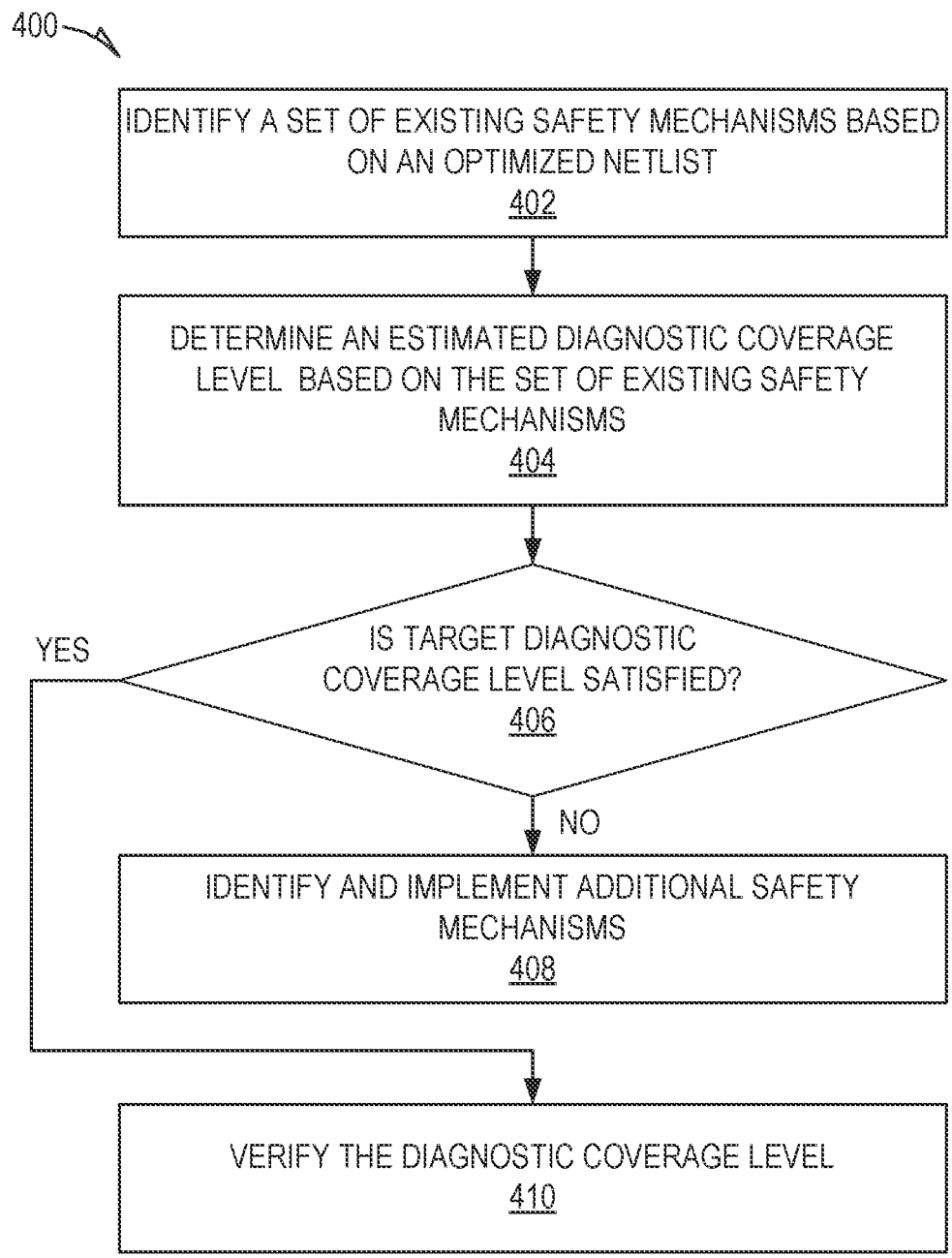
FIG. 4 is a flowchart showing a method for analyzing existing safety mechanism to determine diagnostic coverage, according to some example embodiments.

FIG. 4 is a flowchart showing a method 400 for analyzing existing safety mechanism to determine diagnostic coverage, according to some example embodiments. The method 400 may be embodied in computer readable instructions for execution by one or more processors such that the operations of the method 400 may be performed in part or in whole by the diagnostic coverage determination system 100; accordingly, the method 400 is described below by way of example with reference to the diagnostic coverage determination system 100. However, it shall be appreciated that at least some of the operations of the method 400 may be deployed on various other hardware and/or software configurations and the method 400 is not intended to be limited to the diagnostic coverage determination system 100.

At operation 402, the safety mechanism identification component 106 identifies a set of existing safety mechanisms based on an optimized netlist. The safety mechanism identification component 106 can identify existing safety measures based on a provided input file that lists the existing safety measure or through use of machine learning/artificial intelligence techniques based on known standard functional safety coverage mechanisms, patterns, and key words.

At operation 404, the safety mechanism identification component 106 determines an estimated diagnostic coverage level based on the set of existing safety mechanisms. The safety mechanism identification component 106 can determine the estimated diagnostic coverage level using a variety of techniques, such by using machine cone of logic extraction, input file, hierarchical name matching, and the like.

At operation 406, the safety mechanism identification component 106 determines if a target diagnostic coverage level is satisfied. For example, the safety mechanism identification component 106 determines if the estimated diagnostic coverage level meets or exceeds the target diagnostic coverage level.

If the estimated diagnostic coverage level does not meet or exceed the target diagnostic coverage level (e.g., the estimated diagnostic coverage level is less than the target diagnostic coverage level), the safety mechanism identification component 106 determines that the target diagnostic coverage level is not satisfied and the method continues to operation 408 at which the safety mechanism identification component 106 identities and implements additional safety mechanisms.

Alternatively, if the estimated diagnostic coverage level does meet or exceed the target diagnostic coverage level, the safety mechanism identification component 106 determines that the target diagnostic coverage level is satisfied and the method continues to operation 410 at which the diagnostic coverage level determination component 108 verifies the diagnostic coverage level. The diagnostic coverage level determination component 108 verifies the diagnostic coverage level of the electronic circuit based on the existing and/or additional safety mechanisms that were identified or added by the safety mechanism identification component 106. For example, the diagnostic coverage level determination component 108 may perform a fault campaign in which faults are injected into the nodes of the electronic circuit to determine the coverage provided by the safety mechanisms. The diagnostic coverage level determination component 108 performs this process based on the reduced number of nodes in the optimized netlist, thereby reducing the computing resources and time associated with determining the diagnostic coverage level.

Figure 5:
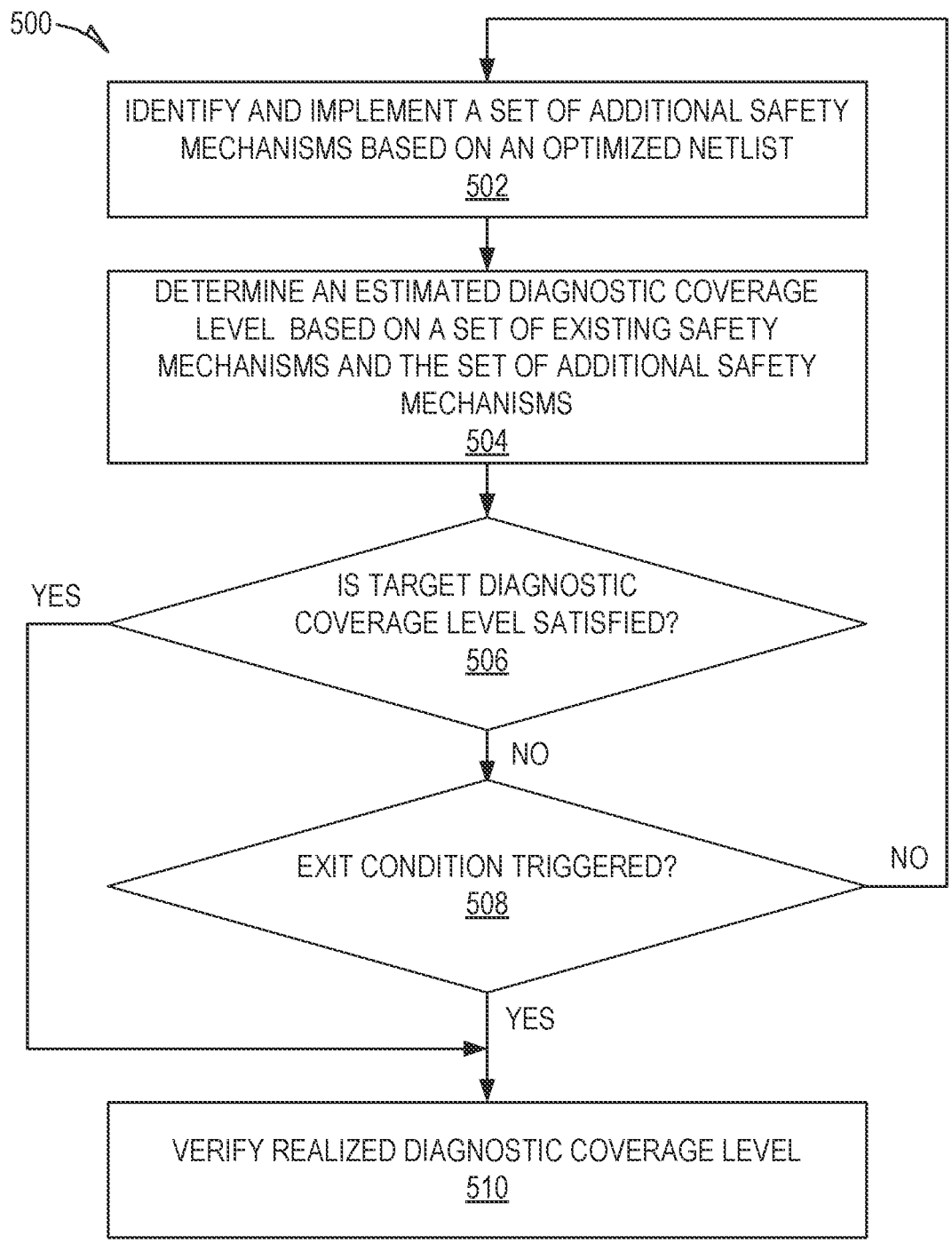
FIG. 5 is a flowchart showing a method for analyzing additional safety mechanism to determine diagnostic coverage, according to some example embodiments.

FIG. 5 is a flowchart showing a method 500 for analyzing additional safety mechanism to determine diagnostic coverage, according to some example embodiments. The method 500 may be embodied in computer readable instructions for execution by one or more processors such that the operations of the method 500 may be performed in part or in whole by receive the diagnostic coverage determination system 100; accordingly, the method 500 is described below by way of example with reference to the diagnostic coverage determination system 100. However, it shall be appreciated that at least some of the operations of the method 500 may be deployed on various other hardware and/or software configurations and the method 500 is not intended to be limited to the diagnostic coverage determination system 100.

At operation 502, the safety mechanism identification component 106 identifies and implements a set of additional safety mechanisms based on an optimized netlist. The safety mechanism identification component 106 can identify additional safety measures based on machine learning/artificial intelligence techniques such as pattern matching of safety mechanism libraries to known patterns or by being supplied a list of additional functional safety mechanisms and locations such as from a Functional Safety Mechanism Input File. The safety mechanism identification component 106 implements the additional safety mechanism with the goal of increasing the diagnostic coverage level of the electronic circuit to the target diagnostic coverage level.

At operation 504, the safety mechanism identification component 106 determines an estimated diagnostic coverage level based on the set of existing safety mechanisms and the set of additional safety mechanisms. The safety mechanism identification component 106 can determine the estimated diagnostic coverage level using a variety of techniques, such by using machine cone of logic extraction, input file, hierarchical name matching, and the like.

At operation 506, the safety mechanism identification component 106 determines if a target diagnostic coverage level is satisfied. For example, the safety mechanism identification component 106 determines if the estimated diagnostic coverage level meets or exceeds the target diagnostic coverage level.

If the estimated diagnostic coverage level does meet or exceed the target diagnostic coverage level, the safety mechanism identification component 106 determines that the target diagnostic coverage level is satisfied and at operation 510 the diagnostic coverage level determination component 108 verifies the diagnostic coverage level of the electronic circuit based on the existing and additional safety mechanisms that were identified and added by the safety mechanism identification component 106.

Alternatively, if the estimated diagnostic coverage level does not meet or exceed the target diagnostic coverage level (e.g., the estimated diagnostic coverage level is less than the target diagnostic coverage level), the safety mechanism identification component 106 determines that the target diagnostic coverage level is not satisfied and at operation 508 the safety mechanism identification component 106 determines if an exit condition has been triggered. For example, the safety mechanism identification component 106 determines if the possible additional safety measured have been exhausted, a specified time period has expired, and the like.

Figure 6:
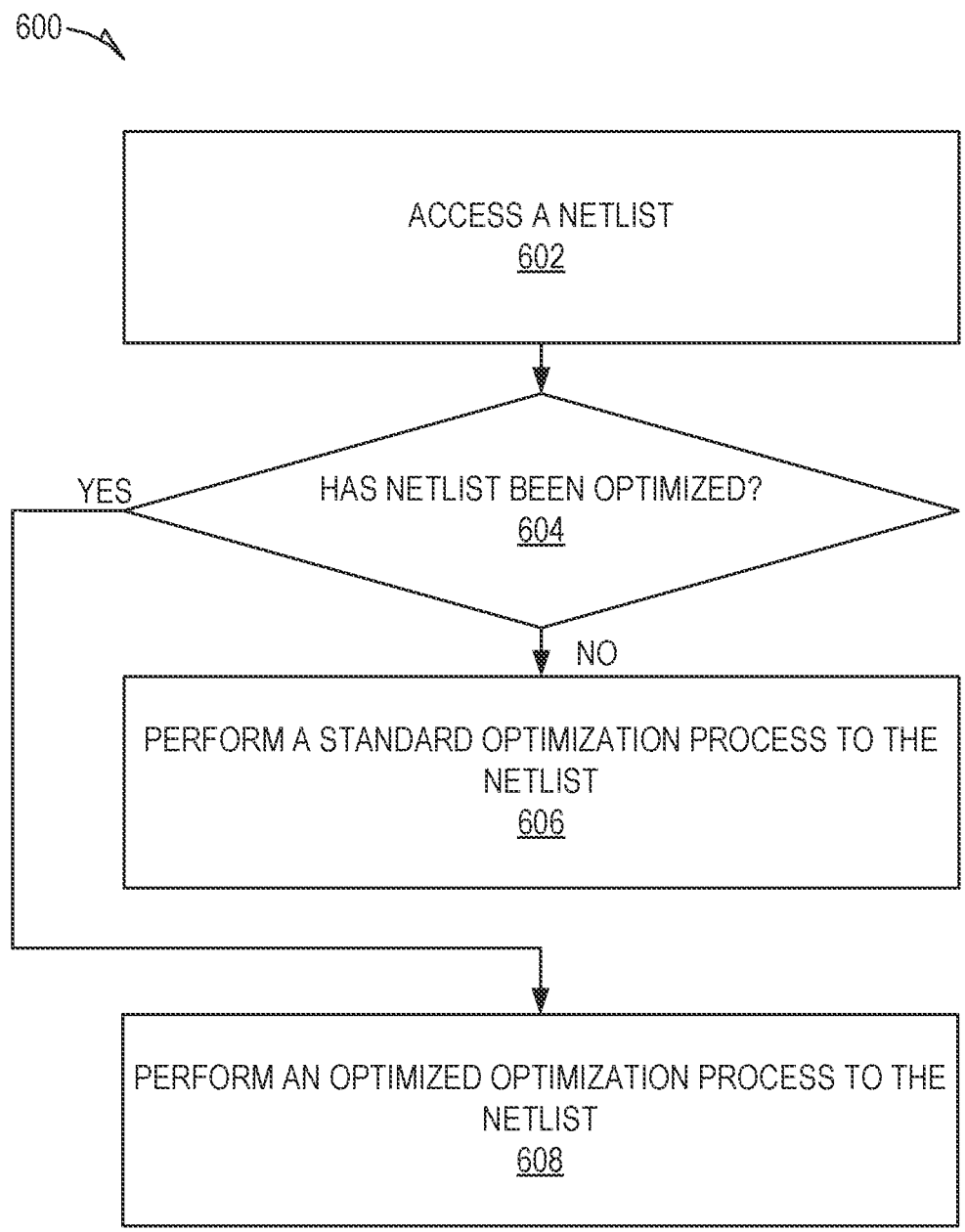
FIG. 6 is a flowchart showing a method of optimizing a netlist at multiple points during the ASIC design process, according to some example embodiments.

If an exit condition has been triggered, at operation 510 the diagnostic coverage level determination component 108 verifies the diagnostic coverage level of the electronic circuit based on the existing and additional safety mechanisms that were identified and added by the safety mechanism identification component 106. Alternatively, if an exit condition has not been satisfied, the safety mechanism identification component 106 repeats the process by identifying and implementing additional safety FIG. 6 is a flowchart showing a method 600 of optimizing a netlist at multiple points during the ASIC design process, according to some example embodiments. The method 600 may be embodied in computer readable instructions for execution by one or more processors such that the operations of the method 600 may be performed in part or in whole by a diagnostic coverage determination system 100; accordingly, the method 600 is described below by way of example with reference to the diagnostic coverage determination system 100. However, it shall be appreciated that at least some of the operations of the method 600 may be deployed on various other hardware and/or software configurations and the method 600 is not intended to be limited to the diagnostic coverage determination system 100.

At operation 602, the data accessing component 102, accesses a netlist. The netlist may be a Register Transfer Language (RTL) netlist, a gate level netlist, or a Design for Test (DFT) netlist. The data accessing component 102 may access the netlist from the data storage 112 and/or an external device (not shown) that is in network communication with the data accessing component 102.

At operation 604, the node reduction component 104 determines if the netlist has been optimized. If the netlist has not been previously optimized, at operation 606, the node reduction component 104 perform a standard optimization process to the netlist. This may include applying each of the node reduction techniques or a subset of the node reduction techniques based on the node reduction techniques identified to be applied to the netlist in the optimization parameters.

Alternatively, if the netlist has been previously optimized, at operation 608 the node reduction component 104 performs an optimized optimization process to the netlist. This may include applying a subset of the node reduction techniques based on the type of netlist. For example, the node reduction component 104 may apply a formal node reduction technique to an optimized RTL netlist, a test node reduction technique to an gate level netlist, a formal node reduction technique to a DFT netlist.

Software Architecture

Figure 7:
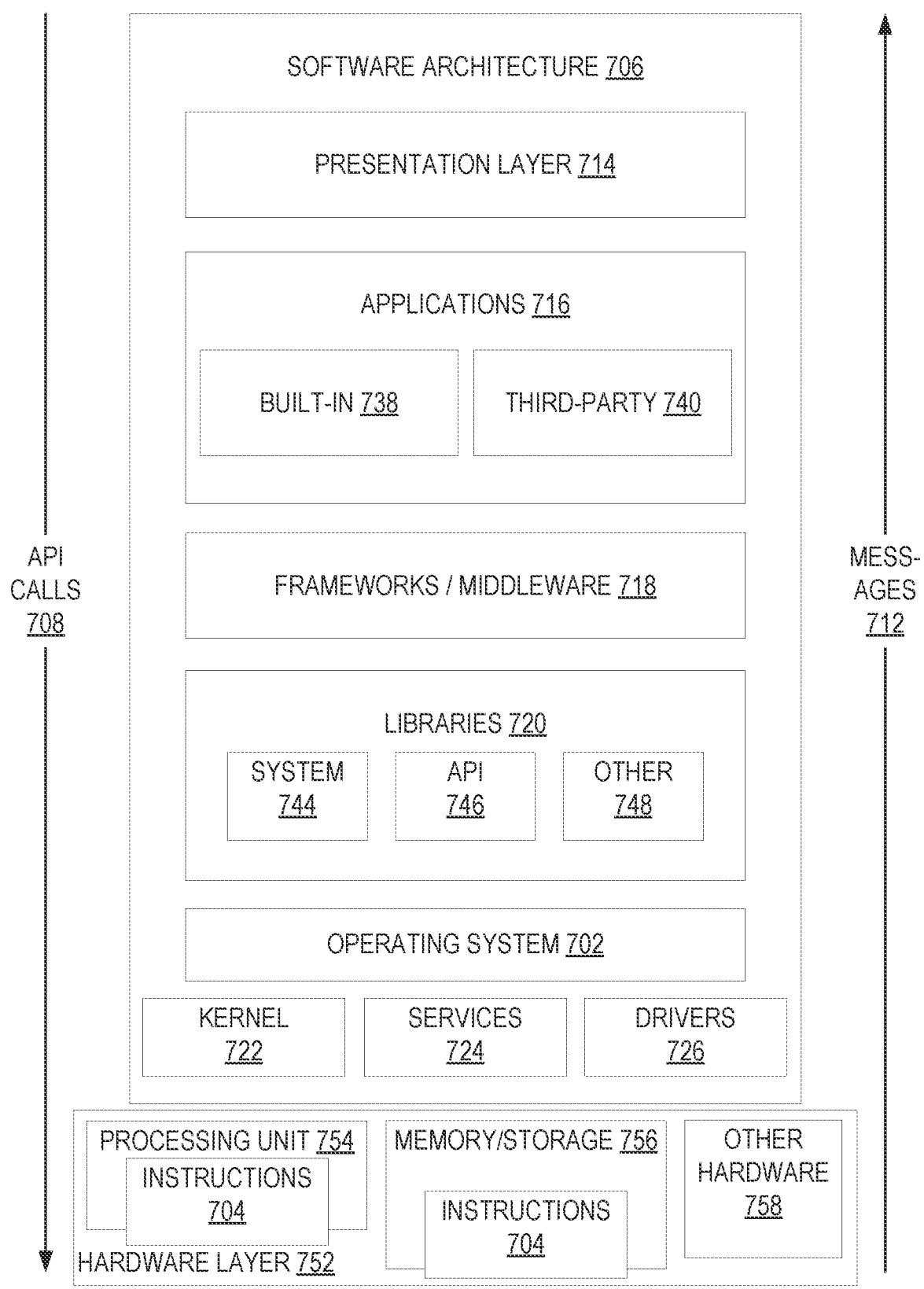
FIG. 7 is a block diagram illustrating an example software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality, such as the Open Systems Interconnection model (OSI model). For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, NG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
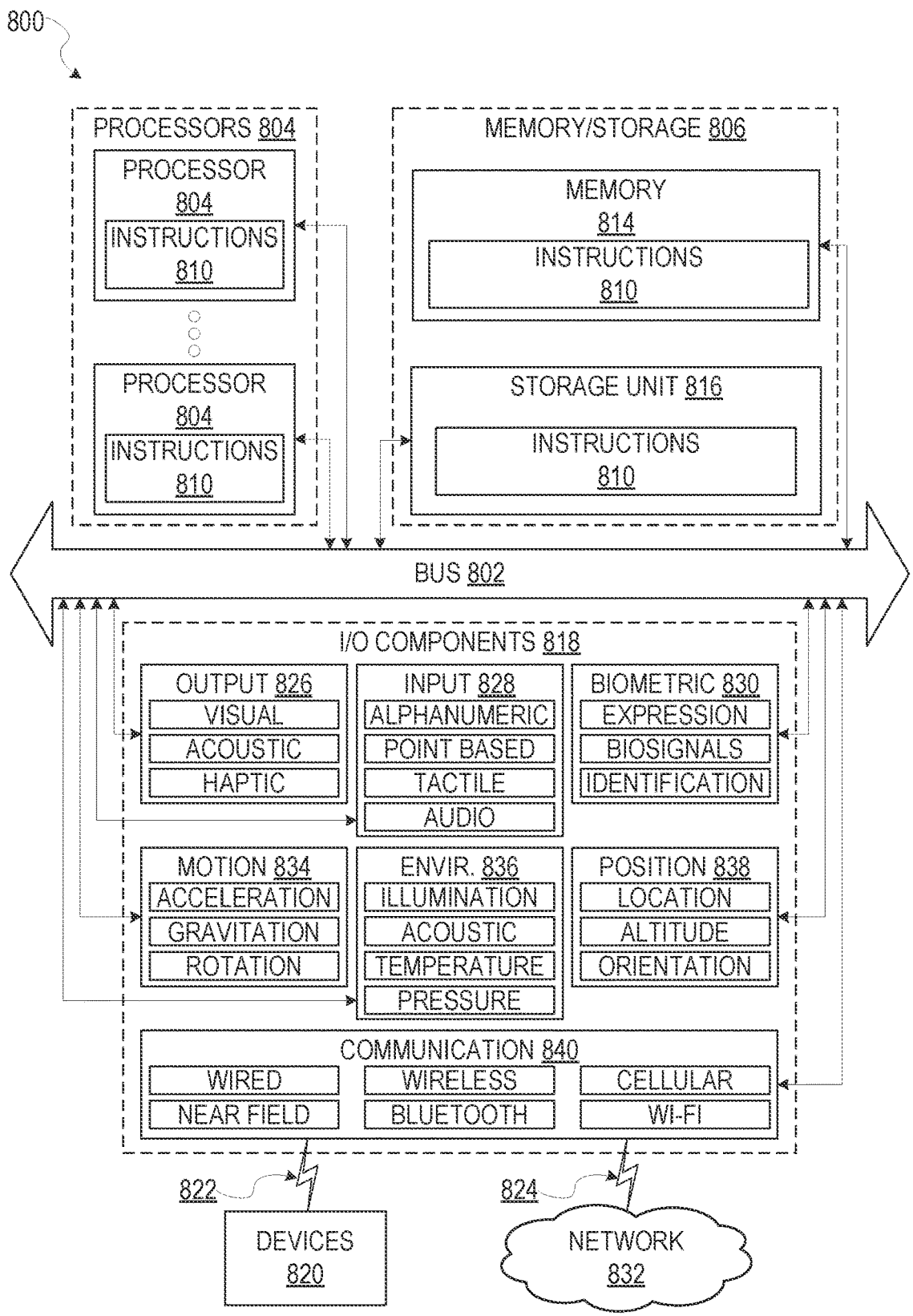
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (SIB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and 110 components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a UPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times, Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

What is claimed is:
1. A method comprising:
accessing, by one or more computer processors, an existing netlist and optimization parameters, the existing netlist describing connectivity of a plurality of nodes included in an electronic circuit, and the optimization parameters defining parameters for reducing a number of nodes included in the existing netlist;
applying, by the one or more computer processors and based on the optimization parameters, at least a first node reduction technique to the existing netlist, resulting in an optimized netlist for the electronic circuit, the optimized netlist describing connectivity of a subset of the plurality of nodes included in the electronic circuit;
identifying, by the one or more computer processors and based in the optimized netlist, one or more injection nodes of the electronic circuit and identifying a set of safety mechanisms for achieving a target diagnostic coverage level associated with the electronic circuit, the one or more injection nodes being determined by applying a cone of logic extraction on the electronic circuit;
verifying, by the one or more computer processors, that a realized diagnostic coverage level of the electronic circuit satisfies the target diagnostic coverage level, the realized diagnostic coverage level being determined based on the optimized netlist and the set of safety mechanisms by performing a fault campaign on the electronic circuit, the fault campaign being configured to inject faults into the one or more injection nodes of the electronic circuit based on the optimized netlist and the set of safety mechanisms to determine the realized diagnostic coverage level provided by the set of safety mechanisms; and
performing, by the one or more computer processors, a synthesis process that translates the optimized netlist to a gate level netlist based on a safety mechanisms preservation file, the gate level netlist comprising one or more actual logic gates, the synthesis process being configured to eliminate redundant or replicated logic from the gate level netlist, the safety mechanisms preservation file identifying one or more safety mechanisms to be preserved in the gate level netlist and not optimized away from the gate level netlist by the synthesis process.

2. The method of claim 1, wherein the applying of the first node reduction technique to the existing netlist comprises:
selecting the subset of the plurality of nodes based on a statistically meaningful target value defined by the optimization parameters, the statistically meaningful target value defining a percentage for reducing a number of nodes in the plurality of nodes, wherein a number of nodes in the subset of the plurality of nodes is based on the percentage defined by the statistically meaningful target value.

3. The method of claim 1, wherein the applying of the first node reduction technique to the existing netlist comprises:
determining, based on a context of the electronic circuit defined by the optimization parameters, a first set of nodes included in the plurality of nodes that will be unused for the context, wherein the subset of the plurality of nodes does not include the first set of nodes.

4. The method of claim 1, wherein the applying of the first node reduction technique to the existing netlist comprises:
determining, based on a formal structure analysis of the existing netlist, a first set of nodes included in the plurality of nodes that are unreachable, wherein the subset of the plurality of nodes does not include the first set of nodes.

5. The method of claim 1, wherein the applying of the first node reduction technique to the existing netlist comprises:
determining, based on test settings defined by the optimization parameters, a first set of nodes included in the plurality of nodes that are test structures, wherein the subset of the plurality of nodes does not include the first set of nodes.

6. The method of claim 1, wherein the identifying of the set of safety mechanisms for achieving the target diagnostic coverage associated with the electronic circuit comprises:
identifying a set of existing safety mechanisms that are implemented within the electronic circuit; and
identifying a set of additional safety mechanisms that are not included in the electronic circuit, wherein the set of safety mechanisms for achieving the target diagnostic coverage associated with the electronic circuit includes the set of existing safety mechanisms and the set of additional safety mechanisms.

7. The method of claim 1, wherein the existing netlist comprises a Register Transfer Language (RTL) netlist.

8. The method of claim 1, further comprising:
determining, by the one or more computer processors, whether the existing netlist has been previously optimized; and
in response to determining that the existing netlist has been previously optimized, selecting, by the one or more computer processors, the at least the first node reduction technique base on a netlist type of the existing netlist.

9. A system comprising:
one or more computer processors; and
one or more computer-readable mediums storing instructions that, when executed by the one or more computer processors, cause the system to perform operations comprising:
accessing an existing netlist and optimization parameters, the existing netlist describing connectivity of a plurality of nodes included in an electronic circuit, and the optimization parameters defining parameters for reducing a number of nodes included in the existing netlist;
applying, based on the optimization parameters, at least a first node reduction technique to the existing netlist, resulting in an optimized netlist for the electronic circuit, the optimized netlist describing connectivity of a subset of the plurality of nodes included in the electronic circuit;
identifying, based in the optimized netlist, one or more injection nodes of the electronic circuit and identifying a set of safety mechanisms for achieving a target diagnostic coverage level associated with the electronic circuit, the one or more injection nodes being determined by applying a cone of logic extraction on the electronic circuit;
verifying that a realized diagnostic coverage level of the electronic circuit satisfies the target diagnostic coverage level, the realized diagnostic coverage level being determined based on the optimized netlist and the set of safety mechanisms by performing a fault campaign on the electronic circuit, the fault campaign being configured to inject faults into the one or more injection nodes of the electronic circuit based on the optimized netlist and the set of safety mechanisms to determine the realized diagnostic coverage level provided by the set of safety mechanisms; and performing a synthesis process that translates the optimized netlist to a gate level netlist based on a safety mechanisms preservation file, the gate level netlist comprising one or more actual logic gates, the synthesis process being configured to eliminate redundant or replicated logic from the gate level netlist, the safety mechanisms preservation file identifying one or more safety mechanisms to be preserved in the gate level netlist and not optimized away from the gate level netlist by the synthesis process.

10. The system of claim 9, wherein the applying of the first node reduction technique to the existing netlist comprises:
selecting the subset of the plurality of nodes based on a statistically meaningful target value defined by the optimization parameters, the statistically meaningful target value defining a percentage for reducing a number of nodes in the plurality of nodes, wherein a number of nodes in the subset of the plurality of nodes is based on the percentage defined by the statistically meaningful target value.

11. The system of claim 9, wherein the applying of the first node reduction technique to the existing netlist comprises:
determining, based on a context of the electronic circuit defined by the optimization parameters, a first set of nodes included in the plurality of nodes that will be unused for the context, wherein the subset of the plurality of nodes does not include the first set of nodes.

12. The system of claim 9, wherein the applying of the first node reduction technique to the existing netlist comprises:
determining, based on a formal structure analysis of the existing netlist, a first set of nodes included in the plurality of nodes that are unreachable, wherein the subset of the plurality of nodes does not include the first set of nodes.

13. The system of claim 9, wherein the applying of the first node reduction technique to the existing netlist comprises:
determining, based on test settings defined by the optimization parameters, a first set of nodes included in the plurality of nodes that are test structures, wherein the subset of the plurality of nodes does not include the first set of nodes.

14. The system of claim 9, wherein the identifying of the set of safety mechanisms for achieving the target diagnostic coverage associated with the electronic circuit comprises:
identifying a set of existing safety mechanisms that are implemented within the electronic circuit; and
identifying a set of additional safety mechanisms that are not included in the electronic circuit, wherein the set of safety mechanisms for achieving the target diagnostic coverage associated with the electronic circuit includes the set of existing safety mechanisms and the set of additional safety mechanisms.

15. The system of claim 9, wherein the existing netlist comprises one of a Register Transfer Language (RTL) netlist.

16. The system of claim 9, wherein the identifying of the set of safety mechanisms that are not included in the electronic circuit comprises:
implementing a first set of additional safety mechanisms;
determining an estimated diagnostic coverage level of the electronic circuit based on the additional safety mechanisms; and
in response to determining that the estimated diagnostic coverage level is below the target diagnostic coverage level, implementing a second set of additional safety mechanisms.

17. A non-transitory computer-readable medium storing instructions that, when executed by one or more computer processors of one or more computing devices, cause the one or more computing devices to perform operations comprising:
- accessing an existing netlist and optimization parameters, the existing netlist describing connectivity of a plurality of nodes included in an electronic circuit, and the optimization parameters defining parameters for reducing a number of nodes included in the existing netlist;
- applying, based on the optimization parameters, at least a first node reduction technique to the existing netlist, resulting in an optimized netlist for the electronic circuit, the optimized netlist describing connectivity of a subset of the plurality of nodes included in the electronic circuit;
- identifying, based in the optimized netlist, one or more injection nodes of the electronic circuit and identifying a set of safety mechanisms for achieving a target diagnostic coverage level associated with the electronic circuit, the one or more injection nodes being determined by applying a cone of logic extraction on the electronic circuit;
- verifying that a realized diagnostic coverage level of the electronic circuit satisfies the target diagnostic coverage level, the realized diagnostic coverage level being determined based on the optimized netlist and the set of safety mechanisms by performing a fault campaign on the electronic circuit, the fault campaign being configured to inject faults into the one or more injection nodes of the electronic circuit based on the optimized netlist and the set of safety mechanisms to determine the realized diagnostic coverage level provided by the set of safety mechanisms; and
- performing a synthesis process that translates the optimized netlist to a gate level netlist based on a safety mechanisms preservation file, the gate level netlist comprising one or more actual logic gates, the synthesis process being configured to eliminate redundant or replicated logic from the gate level netlist, the safety mechanisms preservation file identifying one or more safety mechanisms to be preserved in the gate level netlist and not optimized away from the gate level netlist by the synthesis process.

18. The non-transitory computer-readable medium of claim 17, wherein the applying of the first node reduction technique to the existing netlist comprises:
- selecting the subset of the plurality of nodes based on a statistically meaningful target value defined by the optimization parameters, the statistically meaningful target value defining a percentage for reducing a number of nodes in the plurality of nodes, wherein a number of nodes in the subset of the plurality of nodes is based on the percentage defined by the statistically meaningful target value.

* * * * *